US012072859B1

United States Patent
O'Connor

(10) Patent No.: US 12,072,859 B1
(45) Date of Patent: Aug. 27, 2024

(54) ACCESSIBILITY CONTROLS FOR MANIPULATING DATA VISUALIZATIONS

(71) Applicant: Splunk Inc., San Francisco, CA (US)

(72) Inventor: Ryan O'Connor, Mystic, CT (US)

(73) Assignee: Splunk Inc., San Francisco, CA (US)

( * ) Notice: Subject to any disclaimer, the term of this patent is extended or adjusted under 35 U.S.C. 154(b) by 0 days.

(21) Appl. No.: 18/050,016

(22) Filed: Oct. 26, 2022

(51) Int. Cl.
*G06F 3/04847* (2022.01)
*G06F 16/22* (2019.01)
*G06F 16/2458* (2019.01)

(52) U.S. Cl.
CPC .......... *G06F 16/22* (2019.01); *G06F 3/04847* (2013.01); *G06F 16/2474* (2019.01)

(58) Field of Classification Search
CPC ... G06F 16/22; G06F 16/2474; G06F 3/04847
See application file for complete search history.

(56) References Cited

U.S. PATENT DOCUMENTS

| | | | |
|---|---|---|---|
| 7,937,344 B2 | 5/2011 | Baum et al. | |
| 8,112,425 B2 | 2/2012 | Baum et al. | |
| 8,631,325 B1* | 1/2014 | Langseth | G06F 3/04855 715/810 |
| 8,751,529 B2 | 6/2014 | Zhang et al. | |
| 8,788,525 B2 | 7/2014 | Neels et al. | |
| 9,215,240 B2 | 12/2015 | Merza et al. | |
| 9,286,413 B1 | 3/2016 | Coates et al. | |
| 10,127,258 B2 | 11/2018 | Lamas et al. | |
| 2015/0331549 A1* | 11/2015 | Legris | G06F 3/04817 715/800 |
| 2018/0137570 A1* | 5/2018 | Worden | G06Q 40/04 |
| 2018/0176965 A1* | 6/2018 | Mathias | G06F 3/02 |
| 2019/0098106 A1 | 3/2019 | Mungel et al. | |

OTHER PUBLICATIONS

Riki Satogata et al., Q-Mapping: Learning User-Preferred Operation Mappings With Operation-Action Value Function, Sep. 25, 2022, IEEE Transactions on Human-Machine Systems, vol. 52, No. 6, pp. 1090-1102 (Year: 2022).*

(Continued)

*Primary Examiner* — Tam T Tran
(74) *Attorney, Agent, or Firm* — Perkins Coie LLP

(57) ABSTRACT

A computer system displays a graphical user interface (GUI) that includes data visualizations corresponding to data having timestamps within a time interval. A first type of input signal is mapped to a second type of input signal. The first type of input signal is associated with an input device communicatively coupled to the computer system. The second type of input signal is configured to operate a graphical user control of the GUI. Before mapping, the first type of input signal is configured to perform a function that is different from operation of the graphical user control. After receiving an input signal of the first type, an input signal of the second type is applied to the graphical user control based on the mapping. The time interval is adjusted, and the data visualizations are updated automatically to correspond to updated data having timestamps within the adjusted time interval.

17 Claims, 7 Drawing Sheets

(56) References Cited

OTHER PUBLICATIONS

Hanging Ruan et al., TouchInteract: An Interaction Technique with Large Displays Using Touchscreen-Phone, Oct. 1, 2010, Symposia and Workshops on Ubiquitous, Autonomic and Trusted Computing, pp. 262-265 (Year: 2010).*
Splunk Enterprise 8.0.0 Overview, available online, retrieved May 20, 2020 from docs.splunk.com.
Splunk Cloud 8.0.2004 User Manual, available online, retrieved May 20, 2020 from docs.splunk.com.
Splunk Quick Reference Guide, updated 2019, available online at https://www.splunk.com/pdfs/solution-guides/splunk-quick-reference-guide.pdf, retrieved May 20, 2020.
Carraso, David, "Exploring Splunk," published by CITO Research, New York, NY, Apr. 2012.
Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.
Splunk COVID-19 Dasboards, available online at: https://covid-19.splunkforgood.com/hub, 1 page, retrieved Mar. 25, 2022.
U.S. Appl. No. 29/800,320, titled "Display Screen or Portion Thereof Having a Graphical User Interface With a Time Slider for a Map" and filed Jul. 20, 2021.

* cited by examiner

300

```
┌─────────────────────────────────────────────────────────────────────┐
│ CAUSE DISPLAY OF A GRAPHICAL USER INTERFACE THAT INCLUDES A PLURALITY OF DATA │
│ VISUALIZATIONS CORRESPONDING TO A TIME STAMPED DATA SET HAVING TIME STAMPS │
│                       WITHIN A TIME INTERVAL                        │
│                                 302                                 │
└─────────────────────────────────────────────────────────────────────┘
                                   │
                                   ▼
┌─────────────────────────────────────────────────────────────────────┐
│ MAP A FIRST TYPE OF INPUT SIGNAL TO A SECOND TYPE OF INPUT SIGNAL, WHEREIN THE │
│  FIST TYPE OF INPUT SIGNAL IS ASSOCIATED WITH AN INPUT DEVICE AND THE SECOND  │
│    TYPE OF INPUT SIGNAL IS CONFIGURED TO OPERATE A GRAPHICAL USER CONTROL     │
│                                 304                                 │
└─────────────────────────────────────────────────────────────────────┘
                                   │
                                   ▼
┌─────────────────────────────────────────────────────────────────────┐
│                  RECEIVE AN INPUT SIGNAL OF THE FIRST TYPE           │
│                                 306                                 │
└─────────────────────────────────────────────────────────────────────┘
                                   │
                                   ▼
┌─────────────────────────────────────────────────────────────────────┐
│       CAUSE AN INPUT OF THE SECOND TYPE TO BE APPLIED TO THE GRAPHICAL USER CONTROL │
│                                 308                                 │
└─────────────────────────────────────────────────────────────────────┘
                                   │
                                   ▼
┌─────────────────────────────────────────────────────────────────────┐
│                        ADJUST THE TIME INTERVAL                     │
│                                 310                                 │
└─────────────────────────────────────────────────────────────────────┘
                                   │
                                   ▼
┌─────────────────────────────────────────────────────────────────────┐
│     UPDATE THE PLURALITY OF DATA VISUALIZATIONS IN RESPONSE TO THE SECOND INPUT │
│                                 312                                 │
└─────────────────────────────────────────────────────────────────────┘
```

FIG. 3

ACCESSIBILITY CONTROLS FOR MANIPULATING DATA VISUALIZATIONS

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Information technology (IT) environments can include diverse types of data systems that store large amounts of diverse data types generated by numerous devices. For example, a big data ecosystem may include databases such as MySQL and Oracle databases, cloud computing services such as Amazon web services (AWS), and other data systems that store passively or actively generated data, including machine-generated data ("machine data"). The machine data can include log data, performance data, diagnostic data, metrics, tracing data, or any other data that can be analyzed to diagnose equipment performance problems, monitor user interactions, and to derive other insights.

The large amount and diversity of data systems containing large amounts of structured, semi-structured, and unstructured data relevant to any search query can be massive, and continues to grow rapidly. This technological evolution can give rise to various challenges in relation to managing, understanding and effectively utilizing the data. To reduce the potentially vast amount of data that may be generated, some data systems pre-process data based on anticipated data analysis needs. In particular, specified data items may be extracted from the generated data and stored in a data system to facilitate efficient retrieval and analysis of those data items at a later time. At least some of the remainder of the generated data is typically discarded during pre-processing.

However, storing massive quantities of minimally processed or unprocessed data (collectively and individually referred to as "raw data") for later retrieval and analysis is becoming increasingly more feasible as storage capacity becomes more inexpensive and plentiful. In general, storing raw data and performing analysis on that data later can provide greater flexibility because it enables an analyst to analyze all of the generated data instead of only a fraction of it. Although the availability of vastly greater amounts of diverse data on diverse data systems provides opportunities to derive new insights, it also gives rise to technical challenges to search and analyze the data in a performant way.

BRIEF DESCRIPTION OF THE DRAWINGS

Illustrative examples are described in detail below with reference to the following figures:

FIG. 3 is a flowchart illustrating an example process for operating a GUI.

DETAILED DESCRIPTION

Figure 1A:
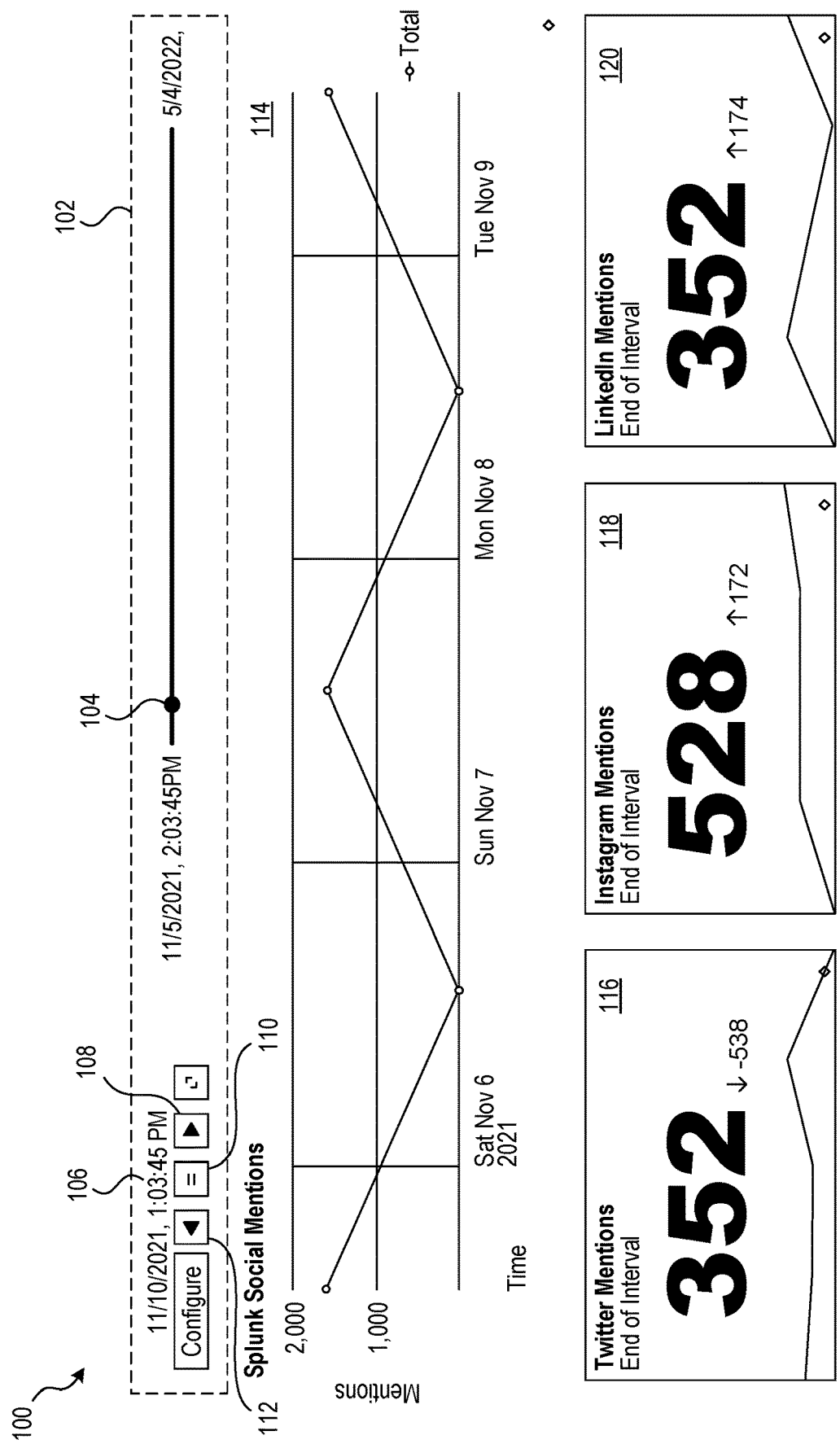
FIG. 1A illustrates an example graphical user interface (GUI).

Data visualizations can make large amounts of complex machine data more accessible, understandable, and usable. Examples of data visualizations include tables, pie charts, column charts, time graphs, scalable vector graphics objects, and the like. A good data visualization improves a user's ability to understand and process data, enabling the user to efficiently identify issues (e.g., technical, performance and/ or security related issues) and gauge system performance. Some data visualizations are static visualizations, which are limited in that they do not allow a user to interact with the data to guide or focus their analysis. In contrast, an interactive visualization, also called a dynamic visualization, allows a user to modify a visual representation of the data. For example, with interactive visualization a user may input a command to change the color, scale, or orientation of a bar graph and then see the result substantially instantaneously.

Data visualizations can be included in a graphical user interface (GUI) that enables a user to interact with the data visualizations to gain additional insights. To interact with user interface elements of a GUI, users can click, drag, and scroll through user interface elements using a mouse pointer, as well as tap and perform gestures on a touchscreen. But although such interaction methods work well for a majority of users, current GUIs are limited when it comes to accessibility. For example, users with visual or motor impairments are often unable to practically interact with many GUIs. Even when a GUI has specialized accessibility controls, these controls are often cumbersome and inefficient to navigate and activate.

In addition, users may want to focus on a more specific time range or other aspect of data when viewing and manipulating data visualizations. To view data visualizations corresponding to different periods of time, the user may need to modify an underlying data structure or document, such as a spreadsheet, and then rebuild the data visualizations. Otherwise, drop-down lists are often used in GUIs to specify dates, such as separate drop-down lists to select the month, day, and year. Drop-down lists are inconvenient and unwieldy for the typical user, and especially problematic for impaired users. Furthermore, many GUI elements such as drop-down lists are difficult to adapt for accessibility controls.

The technology introduced herein addresses these issues by providing improved accessible controls that allow users to manipulate a GUI for data visualization (henceforth "the GUI"). The GUI can include a plurality of data visualizations (which may be user-specified/user-selected visualizations) associated with the same set of time-stamped data. The data can include, but is not limited to, time-stamped machine data. The GUI can include a graphical user control that can be adjusted by a user to specify or dynamically modify a time interval of the data to be visualized in the GUI. For example, the graphical user control can include a slider. When the graphical user control is adjusted by the user, the plurality of data visualizations are all automatically and simultaneously updated in real-time to reflect data associated with the specified time interval as modified by the adjustment to the graphical user control.

The accessibility of the GUI can be improved by mapping inputs that control the GUI to input signals of a device that is external to the computer system implementing the GUI. For example, the device can be a wireless remote or "clicker" that includes one or more buttons. When a button on the remote or clicker is pressed, the input signal is transmitted to the computer system, which is configured to map the particular input signal to an action that is performed on the GUI. This mapping improves accessibility and overall versatility of the GUI by enabling additional methods of control. For example, a user need not necessarily see the GUI to manipulate GUI elements. In another example, a user who is giving a presentation can use the external device to easily modify the data visualizations as they are being presented, without having to be located at a keyboard of the computer that presents the presentation. The mappings can be configured for a variety of devices, further improving accessibility.

FIG. 1A illustrates an example graphical user interface (GUI) 100. The GUI 100 is displayed on a user's computing device, such as a laptop, tablet, or smartphone (e.g., the computing device 404 of FIG. 4.) The GUI 100 includes multiple data visualizations 114-120 which are graphical representations of data or analysis performed on the data. The data visualizations 114-120 can use data from the same data set, from different data sets, or any combination thereof. The data visualization 116 shown in FIG. 1A displays a number of Twitter® mentions "352" and a change in the number of mentions "-358." Similarly, the data visualization 118 is based on Instagram® mentions, and the data visualization 120 is based on LinkedIn® mentions. The data visualization 114 is based on a total number of social media mentions, which includes at least the social media networks referenced in the data visualizations 116-120.

As shown in FIG. 1A, the data visualization 114 is a line graph, and the data visualizations 116-120 are single value visualizations. The term "single value visualization" refers to a data visualization that comprises a single metric and can additionally include context for the metric. For example, the single metric can be a numerical value, such as the value "352" in the data visualization 116 or the value "128" in the data visualization 118. The context accompanying the metric can include gauges, trendlines, or other numerical information. For example, the data visualization 116 shows a simplified line graph and the number "-138" that indicates a trend in the data. Other example data visualizations displayable in the GUI 100 include area charts, bar charts, bubble charts, choropleth maps, column charts, filler gauges, link graphs, marker gauges, multi-dimensional line graphs, pie charts, punch card visualizations, radial charts, Sankey diagrams, scatterplots, tables, scalable vector graphics objects, uploaded images, etc. The data visualizations can include a variety of shapes, such as rectangles, ellipses, etc.

In some implementations, the data underlying the data visualizations 114-120 are retrieved by executing a search. A separate search can be executed for each of the data visualizations 114-120, for example if the data visualizations 114-120 use different sets of data. In some cases, separate searches may not be needed. For example, Twitter, Instagram, and LinkedIn data shown in data visualizations 116, 118, and 120, respectively, can require separate searches, but the total number of social mentions displayed in visualization 114 can be computed by summing results from the previously executed searches. The search can return a dataset with timestamps that match the time range covered by the graphical user control 102, after which the data visualizations 114-120 are generated. The data underlying the data visualizations 114-120 include a field containing a timestamp. Then, when a user provides an input to the graphical user control 102, the data visualizations 114-120 can be updated by filtering the dataset according to the timestamp field. There is no need to perform additional searches because the relevant range of data has already been searched, thereby saving network and computing resources. The searches can be performed by a data intake and query system, such as the data intake and query system 410 shown in FIG. 4.

The graphical user control 102 includes a sliding element 104 (also referred to as a "slider.") The sliding element 104 can be selected and moved by user input, i.e., by a user operating a user input device, such as a mouse, trackball, or touchscreen. For example, the user can tap, click, or press on the sliding element 104 then drag or slide the sliding element 104. The sliding element 104 can be moved or positioned by user input to specify a time interval or range of data to be visualized in the visualizations 114-120, where the visualizations 114-120 are updated dynamically in response to such user input. As shown in the example of FIG. 1A, a beginning of the time interval is indicated by the graphical user control as Nov. 5, 2021. The sliding element 104 is used to select Nov. 10, 2021 as the current end of the time interval, as indicated by indicator element 106. Accordingly, the data being visualized in the data visualizations 114-120 have time stamps within the range from November 5 to Nov. 10, 2021.

Figure 1B:
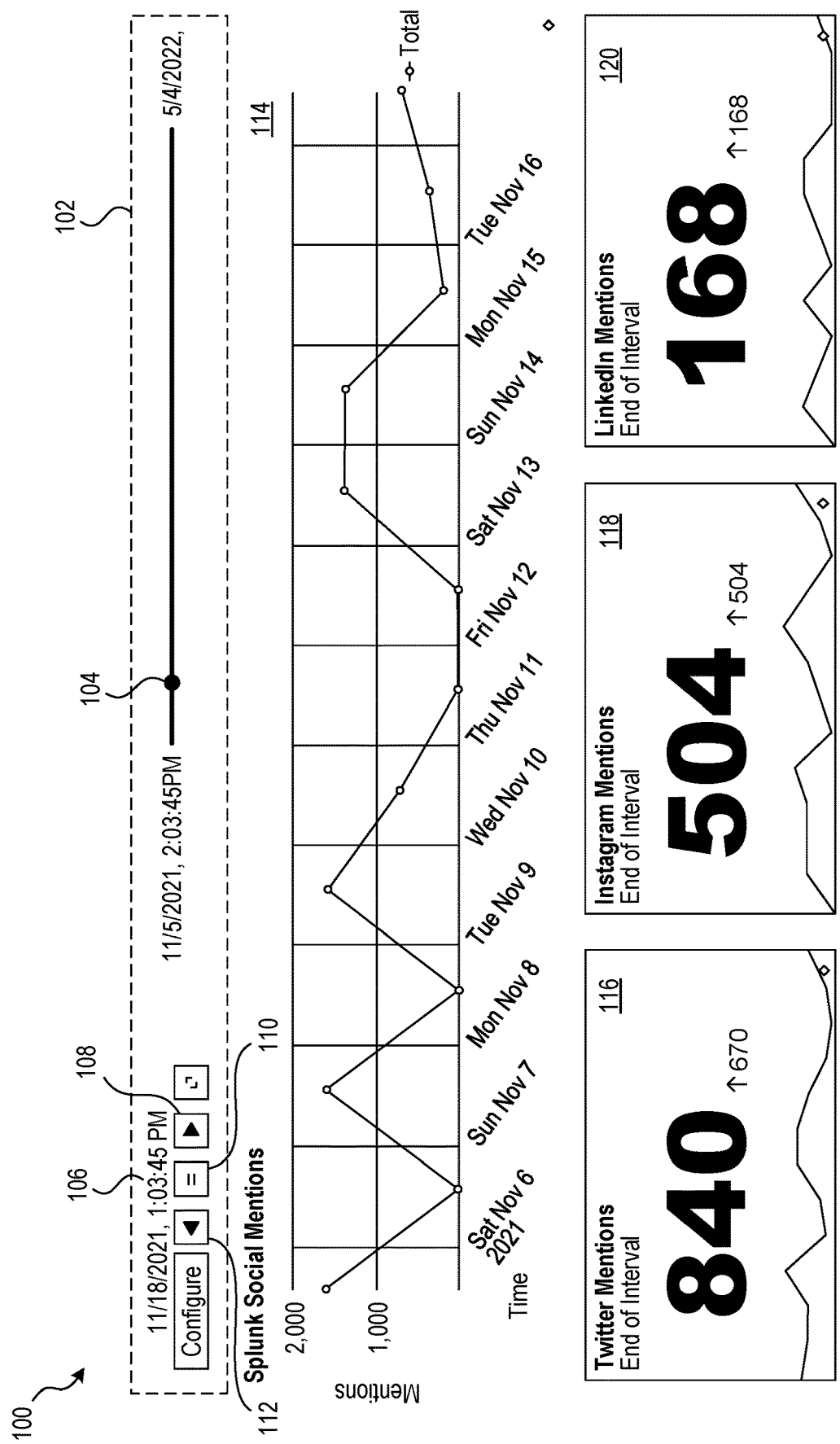
FIG. 1B illustrates the GUI from FIG. 1A at a time interval that has been updated relative to that shown in FIG. 1A.

The position of the sliding element 104 is configured to correspond to the end of the time interval of data being visualized. The position of the sliding element 104 can be continuous or snap to discrete points. For example, when a user selects a time within a threshold distance from a snap point, then the sliding element will automatically move to the snap point instead of the selected time. The discrete points can correspond to specific time stamp values of the underlying data. In some implementations, the graphical user control can be configured with a fixed number of discrete snap points, e.g., evenly spaced points. The granularity or number of snap points can be determined based on properties of the data returned by the initial data search. For example, if the timestamps of the data points are spaced approximately one day apart, then the sliding elements 104 can be configured to snap to fixed time values spaced one day apart. After selecting a particular time interval, the position of the sliding element 104 can be further adjusted to further adjust the time interval, after which the data visualizations 114-120 are updated. An example of how the data visualizations 114-120 are updates is shown in FIG. 1B.

In some implementations, the graphical user control 102 includes two sliding elements 104 that correspond to a beginning of the time interval and the end of the time interval, respectively. For instance, a first sliding element can be moved to select the beginning of the time interval, and a second sliding element can be moved to select the end of the time interval. Besides sliders and buttons, in other implementations, the graphical user control 102 can include toggles, drop-downs, scrollbars, dials, etc.

The GUI 100 includes a playback element 108. When an input is received at the playback element 108, a time-lapse can be displayed of the data visualizations 114-120. During time-lapse display, a time interval is repeatedly updated based on a frame rate, and the subset of data being used to display the data visualizations 114-120 is updated using the updated time interval. For example, an hour can be added to the time interval for each update during time-lapse playback. As a result, display of the data visualizations 114-120 can correspondingly update using data within each updated time interval. The sliding element 104 moves as the time-lapse playback executes. As an example, the graph shown in data visualization 114 expands along the time axis during time-lapse playback. Meanwhile, the data visualization 116 that displays the total number of Twitter® mentions in the interval can increase according to the data and the frame rate.

The GUI 100 can include a pause element 110 configured to pause the time-lapse playback. A reverse playback element 112 enables reverse time-lapse playback, meaning that playback progresses backwards in time. For instance, the endpoint value of a time interval reflected in the data visualizations 114-120 can decrease at a certain frame rate, and the data visualizations 114-120 can be updated accordingly.

Accessible controls are provided for a user can interact with the various elements 104-112 of the graphical user control 102 by mapping input signals from an input device to the GUI 100. The input device can be communicatively coupled to the user's computing device that displays the GUI 100. For example, the input device can be communicatively coupled by a wired or wireless connection, such as Wi-Fi or Bluetooth. In some implementations, the input device is designed or initially configured to transmit input signals to the user's computing device to perform functions unrelated to the operation of the GUI 100. For example, the input device can be a Bluetooth remote or clicker that applies specific inputs used to advance digital slideshows or to capture photographs (e.g., selfies). An example input device is input device 204 shown in FIG. 2.

The input signal of the input device can be mapped to specific actions performed on the various elements 102-120 of the GUI 100. In addition, the input device can be configured to transmit multiple types of input signals, for example corresponding to different buttons on the input device. For example, different input signals from the input device can be mapped to various actions performed on the sliding element 104, playback element 108, pause element 110, or reverse playback element 112 of the graphical user control 102. To illustrate, a first input signal from the input device can be mapped to an input to the playback element 108 and a second input signal can be mapped to an input to the pause element 110. The user can then trigger play and pause time-lapse animation of the data visualizations 114-120 by causing the first and second input signals to be transmitting from the input device, e.g., by pressing corresponding buttons on the input device. In some implementations, therefore, the user can operate the graphical user control 102 without manipulating a cursor or touching a user interface element through a touchscreen.

The input signals of the input device can be mapped to various types of actions, such as clicking, holding, or dragging. In some implementations, the input signal from the input device is specifically mapped to the sliding element 104 that controls the time interval of data being visualized in the GUI 100. For instance, an input signal transmitted by pressing a button on a clicker can be mapped to an action that moves the position of the sliding element 104. In turn, this action adjusts the time interval of the data being visualized, and the data visualizations 114-120 are updated in real time. Thus, a user can easily visualize how data changes over time by pressing the button on the clicker. The sliding element 104 can be moved to expand the time interval or move the time interval forward in time (e.g., without changing the overall length of the time interval) to show how data evolves over time. The sliding element 104 can also be moved to compress the time interval or to move the time interval backward in time.

In some implementations, the input signals depend on discrete actions to the input device, such as a button press or a click. For example, each button press can cause the sliding element 104 to move a fixed distance, such as corresponding to a same amount of time for each press of the button. In another example, each button press can cause the sliding element 104 to move a distance that corresponds to the next data point, which can vary if time stamps are not evenly spaced. The input signals can also depend on the non-discrete factors, such as the amount of time a button is held, an orientation of the input device, etc. For instance, the sliding element 104 can move proportionally to an amount of time an input is performed.

In some implementations, to execute the mapping between the input device and the GUI 100, the input signal is first mapped from the input device into an intermediate type of input signal and then mapped from the intermediate type of input signal to the GUI 100. For example, the intermediate type of input signal can be a mouse click or a key press of a key on a keyboard, and the mapping from the input signal of the input device to the intermediate type of input signal can be configured by a driver associated with the input device. The intermediate input signal may be more compatible with the GUI 100's application programming interface (API), which can be configured to interact with mice and other conventional input mechanisms. Thus, using an intermediate input signal improves usage of the GUI 100 without needing to substantially reconfigure the GUI 100. For example, as discussed previously, the input device can be a clicker configured to advance slides during a digital presentation. In some implementations, the clicker's input signals are interpreted by the user's computing device as specific keyboard inputs. For example, the clicker can include one button that causes "Page Down" and another button that causes "Page Up" to be applied on the computing device. The inputs of the clicker can thus be mapped to the GUI 100 by first mapping these the input signals from the clicker to keyboard inputs, which are themselves mapped to actions performed on the GUI 100 by the application programming interface (API). In some implementations, this enables multiple input devices to be simultaneously mapped to the GUI 100.

FIG. 1B illustrates the GUI 100 displaying the data from FIG. 1A at a time interval that has been updated relative to that shown in FIG. 1A. As shown, the position of the sliding element 104 has shifted to the right relative to the position of the sliding element 104 in FIG. 1A. The rightward shift of the sliding element 104 can be caused by user input to an external input device based on a mapping between a first type of input signal received from the input device and a second type of input signal configured to operate the GUI 100. The indicator element 106 shows that the endpoint of the time interval is now Nov. 18, 2021, eight days after the date indicated in FIG. 1A. Accordingly, the data visualization 114 is updated to show additional data points reflecting the updated time interval. The data visualizations 116-120 perform the same analysis or calculations on data as in FIG. 1A, except the data underlying the analysis or calculations are associated with the updated time interval.

As previously discussed, the data underlying the data visualizations 114-120 can be retrieved by executing a search, which can determine the number of data points covered by the length of the slider. As shown in FIG. 1B, there is sufficient length of the remaining slider such that the sliding element 104 can be further moved to further adjust the time interval. The user can then provide an input to an external input device, and the input signal received from the input device can be mapped to the sliding element 104, which causes the data visualizations 114-120 to be updated by filtering the dataset according to the timestamp field of the searched data. Because the relevant range of data has already been searched, there is no need to perform additional searches. As a result, a user can preload the data and then manipulate the data visualizations 114-120 without further network connection. The user can also quickly update the data visualizations 114-120 using the external input device without being limited by search time, which can be affected by network latency, bandwidth, etc.

Figure 2:
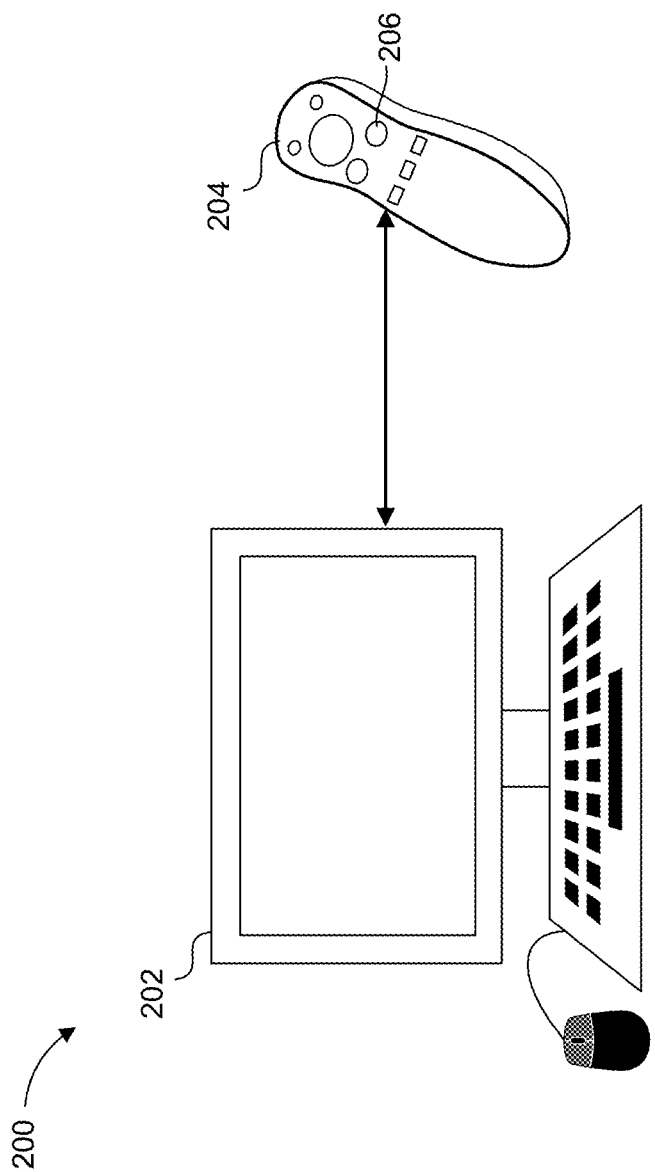
FIG. 2 illustrates an example system for operating a GUI.

FIG. 2 illustrates an example system 200 for operating a GUI. The system 200 includes a computing device 202 communicatively coupled to an input device 204. The computing device 202 is similar to the input device 408 of FIG. 4 and can be configured to cause display of a GUI, e.g., the GUI 100 shown in FIGS. 1A and 1B. The input device 204 is similar to the input device 408 of FIG. 4 and can be used to operate the GUI based on the input signals transmitted from the input device 204 to the computing device 202. Specifically, the input signals from the input device 204 can be mapped to elements of the GUI displayed on the computing device 202.

The input device 204 shown in FIG. 2 is a remote, but the input device 204 can also be a clicker, keyboard, joystick, trackball, or other device. The input device 204 can be configured in addition to conventional input mechanisms of the computing device 202, such as a mouse, keyboard, or integrated trackpad. The input device 204 is shown with a button 206, which when pressed causes the input device 204 to transmit an input signal to the computing device 202. Besides buttons, the input device 204 can include a scroll wheel, switch, touch sensor, microphone, or other input mechanism. In some implementations, the input device 204 is configured to pair with the computing device 202 wirelessly, such as using Bluetooth.

FIG. 3 is a flowchart illustrating an example process 300 for operating a GUI. The example process 300 can be implemented, for example, by a computing device (e.g., computing device 404 or data intake and query system 410) that comprises a processor and a non-transitory computer-readable medium. The non-transitory computer readable medium can be storing instructions that, when executed by the processor, can cause the processor to perform the operations of the illustrated process 300. Alternatively or additionally, the process 300 can be implemented using a non-transitory computer-readable medium storing instructions that, when executed by one or more processors, case the one or more processors to perform the operations of the process 300 of FIG. 3.

At 302, display is caused of a GUI that includes a plurality of data visualizations corresponding to a time stamped data set having time stamps within a time interval. For example, the GUI can be similar to the GUI 100 FIGS. 1A and 1B. The plurality of data visualizations can include at least one of: a bar chart, a pie chart, a line graph, a scatterplot, a bubble chart, a table, a scalable vector graphics object, or a single value visualization.

At 304, a first type of input signal is mapped to a second type of input signal that is different from the first type of input signal. The first type of input signal is associated with an input device communicatively coupled to the computer system, and the second type of input signal is configured to operate a graphical user control of the GUI. For example, the input device can be similar to the input device 204 of FIG. 2. In some implementations, the input device is a clicker or a wireless remote. In some implementations, prior to the mapping, the first type of input signal is configured to perform a function that is different from operation of the graphical user control. For instance, the first type of input signal can be configured to navigate presentation slides that are not part of the graphical user control.

In some implementations, mapping the first type of input signal to the second type of input signal includes first mapping the first type of input signal to an intermediate type of input signal and then mapping the intermediate type of input signal to the second type of input signal that is configured to operate the graphical user control of the GUI.

At 306, an input signal of the first type is received from the input device. At 308, in response to the input signal of the first type received at 306, an input signal of the second type is applied to the graphical user control based on the mapping performed at 304.

At 310, the time interval is adjusted in response to the input of the second type. For example, the input of the second type can cause the time interval to be adjusted by incrementing the time interval. In other examples, the time interval can be compressed, shifted forward in time, or shifted backward in time. How the time interval is adjusted can depend on the particular input of the second type.

At 312, the plurality of data visualizations displayed at 302 are updated automatically in response to the second input. The plurality of data visualizations are updated to correspond to an updated data set having timestamps within the time interval adjusted at 310. For instance, if the time interval is incremented, then the plurality of data visualizations are updated according to the incremented time interval.

In some implementations, the graphical user control includes a slider. The input signal of the second type applied at 308 causes a position of the slider to be moved, and the plurality of data visualizations are then updated at 312 as the position of the slider changes.

In some implementations, the graphical user control includes a playback element. In response to receiving an input to the playback element, the plurality of data visualizations can be updated at 312 by causing a time-lapse display of the plurality of data visualizations by iterative updating.

In some implementations, a search is executed for each of the plurality of data visualizations displayed at 302. Each of the data visualizations are then visualizations of the respective search results. For example, each search can return a timestamped dataset, and the datasets returned by the searches can be different from each other or can overlap. Each of the plurality of data visualizations displayed at 302 and each of the plurality of data visualizations updated at 312 are visualizations of the respective set of search results.

Entities of various types, such as companies, educational institutions, medical facilities, governmental departments, and private individuals, among other examples, operate computing environments for various purposes. Computing environments, which can also be referred to as information technology environments, can include inter-networked, physical hardware devices, the software executing on the hardware devices, and the users of the hardware and software. As an example, an entity such as a school can operate a Local Area Network (LAN) that includes desktop computers, laptop computers, smart phones, and tablets connected to a physical and wireless network, where users correspond to teachers and students. In this example, the physical devices may be in buildings or a campus that is controlled by the school. As another example, an entity such as a business can operate a Wide Area Network (WAN) that includes physical devices in multiple geographic locations where the offices of the business are located. In this example, the different offices can be inter-networked using a combination of public networks such as the Internet and private networks. As another example, an entity can operate a data center at a centralized location, where computing resources (such as compute, memory, and/or networking resources) are kept and maintained, and whose resources are accessible over a network to users who may be in different geographical locations. In this example, users associated with the entity that operates the data center can access the computing resources in the data center over public and/or private networks that may not be operated and controlled by the same entity. Alternatively or additionally, the operator of the data center may provide the computing resources to users associated with other entities, for example on a subscription basis. Such a data center operator may be referred to as a cloud services provider, and the services provided by such an entity may be described by one or more service models, such as to Software-as-a Service (SaaS) model, Infrastructure-as-a-Service (IaaS) model, or Platform-as-a-Service (PaaS), among others. In these examples, users may expect resources and/or services to be available on demand and without direct active management by the user, a resource delivery model often referred to as cloud computing.

Entities that operate computing environments need information about their computing environments. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and may want information about the computing environment that can aid the entity in understanding whether the computing environment is operating efficiently and for its intended purpose.

Collection and analysis of the data from a computing environment can be performed by a data intake and query system such as is described herein. A data intake and query system can ingest and store data obtained from the components in a computing environment, and can enable an entity to search, analyze, and visualize the data. Through these and other capabilities, the data intake and query system can enable an entity to use the data for administration of the computing environment, to detect security issues, to understand how the computing environment is performing or being used, and/or to perform other analytics.

Figure 4:
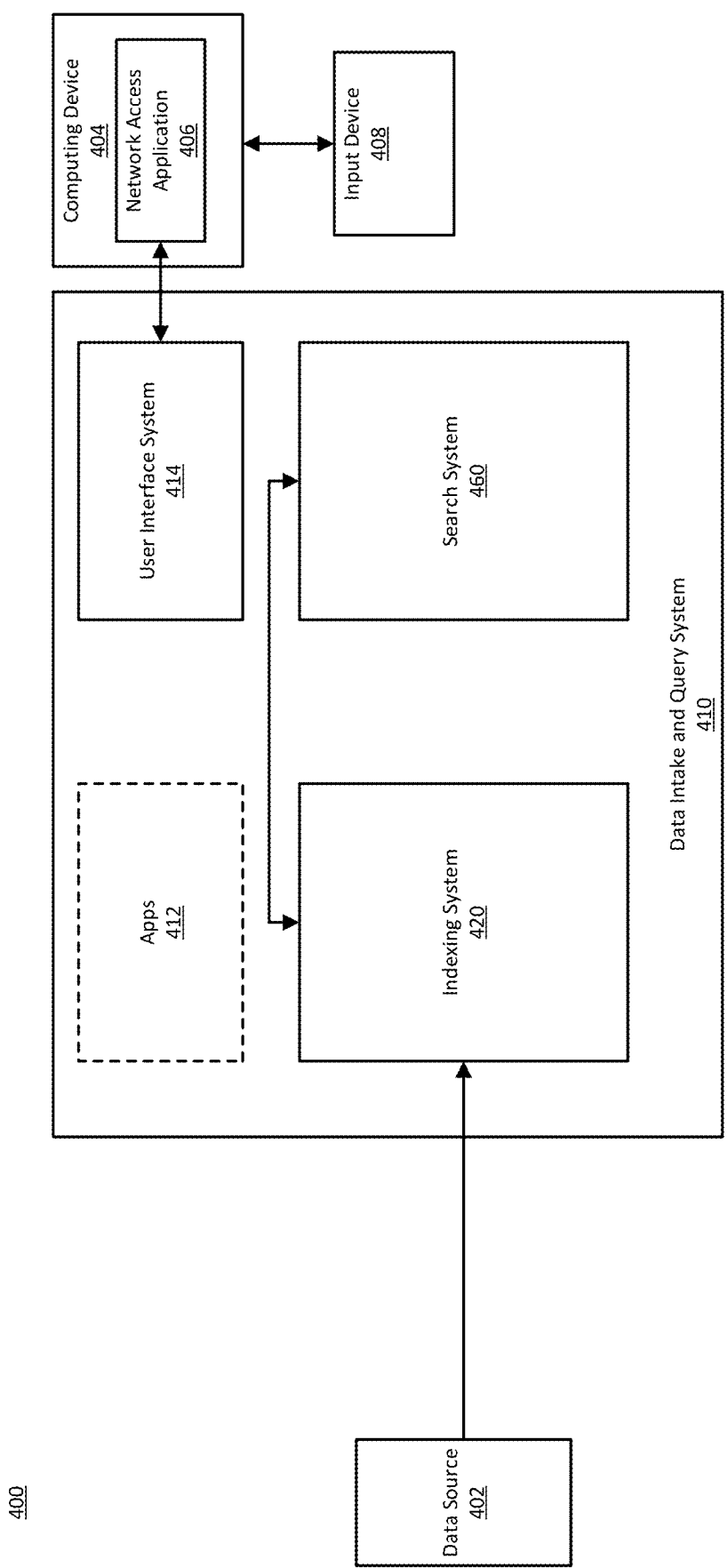
FIG. 4 is a block diagram illustrating an example computing environment that includes a data intake and query system.

FIG. 4 is a block diagram illustrating an example computing environment 400 that includes a data intake and query system 410. The data intake and query system 410 obtains data from a data source 402 in the computing environment 400, and ingests the data using an indexing system 420. A search system 460 of the data intake and query system 410 enables users to navigate the indexed data. Though drawn with separate boxes in FIG. 4, in some implementations the indexing system 420 and the search system 460 can have overlapping components. A computing device 404, running a network access application 406, can communicate with the data intake and query system 410 through a user interface system 414 of the data intake and query system 410. Using the computing device 404, a user can perform various operations with respect to the data intake and query system 410, such as administration of the data intake and query system 410, management and generation of "knowledge objects," (user-defined entities for enriching data, such as saved searches, event types, tags, field extractions, lookups, reports, alerts, data models, workflow actions, and fields), initiating of searches, and generation of reports, among other operations. The data intake and query system 410 can further optionally include apps 412 that extend the search, analytics, and/or visualization capabilities of the data intake and query system 410.

The computing device 404 can be communicatively coupled to and receive input signals from an input device 408. For example, as describe above with reference to FIGS. 1-3, input signals from the input device 408 can be mapped to inputs that are configured to operate a graphical user control of a GUI. The input device 408 can be a remote, clicker, keyboard, or other suitable input device. The input device 408 can be communicatively coupled to the computing device 404 by one or more networks using a wired or wireless connection.

The data intake and query system 410 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 410 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power in order to retain data.

In various examples, the program code for the data intake and query system 410 can be executed on a single computing device, or execution of the program code can be distributed over multiple computing devices. For example, the program code can include instructions for both indexing and search components (which may be part of the indexing system 420 and/or the search system 460, respectively), which can be executed on a computing device that also provides the data source 402. As another example, the program code can be executed on one computing device, where execution of the program code provides both indexing and search components, while another copy of the program code executes on a second computing device that provides the data source 402. As another example, the program code can be configured such that, when executed, the program code implements only an indexing component or only a search component. In this example, a first instance of the program code that is executing the indexing component and a second instance of the program code that is executing the search component can be executing on the same computing device or on different computing devices.

The data source 402 of the computing environment 400 is a component of a computing device that produces machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred as a hypervisor), a container, or a container orchestrator, among other examples. Examples of computing devices that can provide the data source 402 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail below, the indexing system 420 obtains machine date from the data source 402 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index is a data storage structure in which the events are stored. The indexing system 420 does not require prior knowledge of the structure of incoming data (e.g., the indexing system 420 does not need to be provided with a schema describing the data). Additionally, the indexing system 420 retains a copy of the data as it was received by the indexing system 420 such that the original data is always available for searching (e.g., no data is discarded, though, in some examples, the indexing system 420 can be configured to do so).

The search system 460 searches the data stored by the indexing system 420. As discussed in greater detail below, the search system 460 enables users associated with the computing environment 400 (and possibly also other users) to navigate the data, generate reports, and visualize search results in "dashboards" output using a graphical interface. Using the facilities of the search system 460, users can obtain insights about the data, such as retrieving events from an index, calculating metrics, searching for specific conditions within a rolling time window, identifying patterns in the data, and predicting future trends, among other examples. To achieve greater efficiency, the search system 460 can apply map-reduce methods to parallelize searching of large volumes of data. Additionally, because the original data is available, the search system 460 can apply a schema to the data at search time. This allows different structures to be applied to the same data, or for the structure to be modified if or when the content of the data changes. Application of a schema at search time may be referred to herein as a late-binding schema technique.

The user interface system 414 provides mechanisms through which users associated with the computing environment 400 (and possibly others) can interact with the data intake and query system 410. These interactions can include configuration, administration, and management of the indexing system 420, initiation and/or scheduling of queries that are to be processed by the search system 460, receipt or reporting of search results, and/or visualization of search results. The user interface system 414 can include, for example, facilities to provide a command line interface or a web-based interface.

Users can access the user interface system 414 using a computing device 404 that communicates with data intake and query system 410, possibly over a network. A "user," in the context of the implementations and examples described herein, is a digital entity that is described by a set of information in a computing environment. The set of information can include, for example, a user identifier, a username, a password, a user account, a set of authentication credentials, a token, other data, and/or a combination of the preceding. Using the digital entity that is represented by a user, a person can interact with the computing environment 400. For example, a person can log in as a particular user and, using the user's digital information, can access the data intake and query system 410. A user can be associated with one or more people, meaning that one or more people may be able to use the same user's digital information. For example, an administrative user account may be used by multiple people who have been given access to the administrative user account. Alternatively or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 404 can provide a human-machine interface through which a person can have a digital presence in the computing environment 400 in the form of a user. The computing device 404 is an electronic device having one or more processors and a memory capable of storing instructions for execution by the one or more processors. The computing device 404 can further include input/output (I/O) hardware and a network interface. Applications executed by the computing device 404 can include a network access application 406, such as a web browser, which can use a network interface of the client computing device 404 to communicate, over a network, with the user interface system 414 of the data intake and query system 410. The user interface system 414 can use the network access application 406 to generate user interfaces that enable a user to interact with the data intake and query system 410. A web browser is one example of a network access application. A shell tool can also be used as a network access application. In some examples, the data intake and query system 410 is an application executing on the computing device 404. In such examples, the network access application 406 can access the user interface system 414 without going over a network.

The data intake and query system 410 can optionally include apps 412. An app of the data intake and query system 410 is a collection of configurations, knowledge objects (a user-defined entity that enriches the data in the data intake and query system 410), views, and dashboards that may provide additional functionality, different techniques for searching the data, and/or additional insights into the data. The data intake and query system 410 can execute multiple applications simultaneously. Example applications include an information technology service intelligence application, which can monitor and analyze the performance and behavior of the computing environment 400, and an enterprise security application, which can include content and searches to assist security analysts in diagnosing and acting on anomalous or malicious behavior in the computing environment 400.

Though FIG. 4 illustrates only one data source, in practical implementations, the computing environment 400 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of the computing environment 400, the data intake and query system 410 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud, and has digital access to resources provided by the computing devices only to the extent that such access is enabled by the provider entity.

In some implementations, the computing environment 400 can include on-prem and cloud-based computing resources, or only cloud-based resources. For example, an entity may have on-prem computing devices and a private cloud. In this example, the entity operates the data intake and query system 410 and can choose to execute the data intake and query system 410 on an on-prem computing device or in the cloud. In another example, a provider entity operates the data intake and query system 410 in a public cloud and provides the functionality of the data intake and query system 410 as a service, for example under a Software-as-a-Service (SaaS) model, to entities that pay for the user of the service on a subscription basis. In this example, the provider entity can provision a separate tenant (or possibly multiple tenants) in the public cloud network for each subscriber entity, where each tenant executes a separate and distinct instance of the data intake and query system 410. In some implementations, the entity providing the data intake and query system 410 is itself subscribing to the cloud services of a cloud service provider. As an example, a first entity provides computing resources under a public cloud service model, a second entity subscribes to the cloud services of the first provider entity and uses the cloud computing resources to operate the data intake and query system 410, and a third entity can subscribe to the services of the second provider entity in order to use the functionality of the data intake and query system 410. In this example, the data sources are associated with the third entity, users accessing the data intake and query system 410 are associated with the third entity, and the analytics and insights provided by the data intake and query system 410 are for purposes of the third entity's operations.

Figure 5:
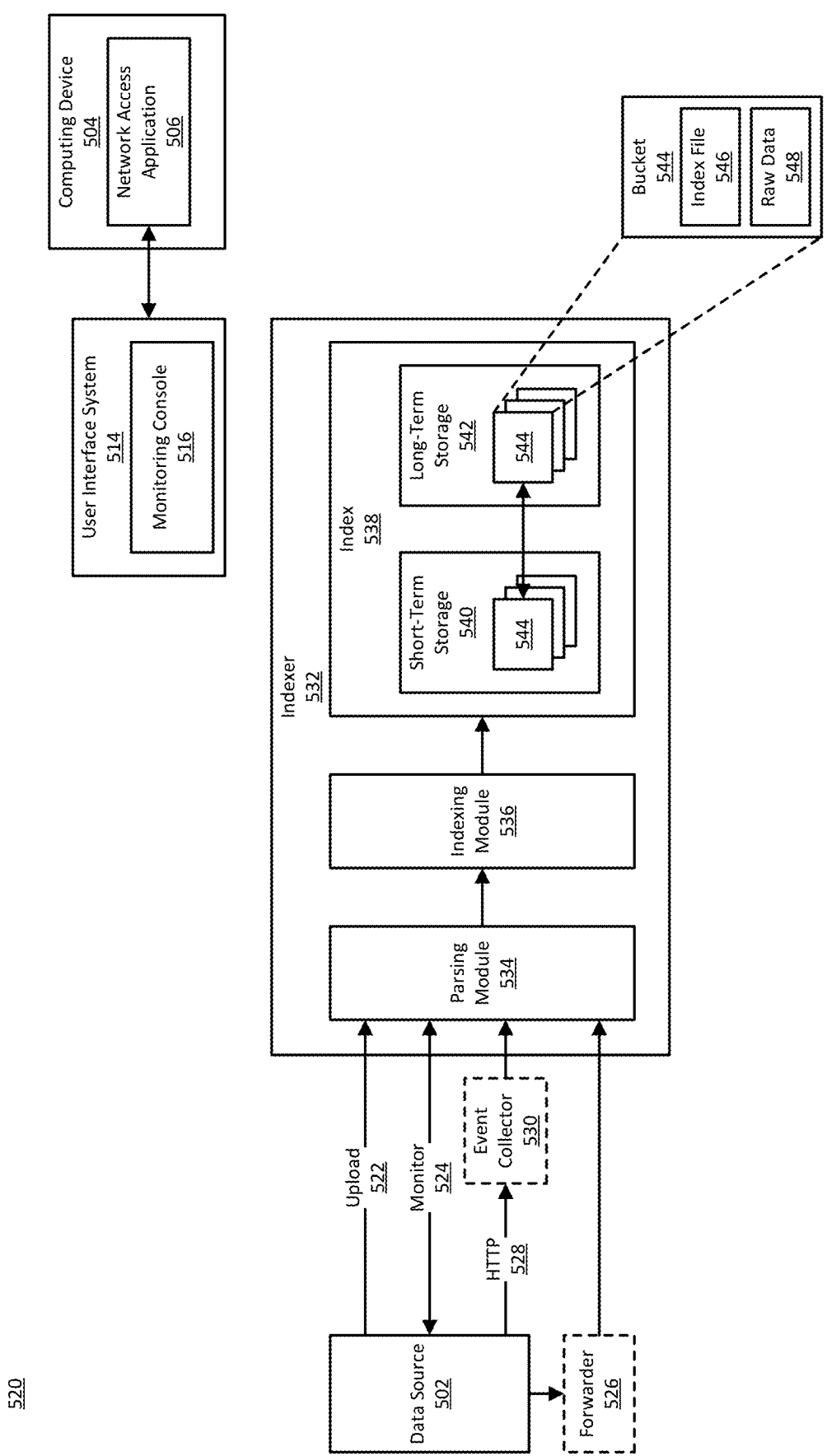
FIG. 5 is a block diagram illustrating an example of an indexing system a data intake and query system.

FIG. 5 is a block diagram illustrating in greater detail an example of an indexing system 520 of a data intake and query system, such as the data intake and query system 410 of FIG. 4. The indexing system 520 of FIG. 5 uses various methods to obtain machine data from a data source 502 and stores the data in an index 538 of an indexer 532. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 520 enables the data intake and query system to obtain the machine data produced by the data source 502 and to store the data for searching and retrieval.

Users can administer the operations of the indexing system 520 using a computing device 504 that can access the indexing system 520 through a user interface system 514 of the data intake and query system. For example, the computing device 504 can be executing a network access application 506, such as a web browser or a terminal, through which a user can access a monitoring console 516 provided by the user interface system 514. The monitoring console 516 can enable operations such as: identifying the data source 502 for data ingestion; configuring the indexer 532 to index the data from the data source 502; configuring a data ingestion method; configuring, deploying, and managing clusters of indexers; and viewing the topology and performance of a deployment of the data intake and query system, among other operations. The operations performed by the indexing system 520 may be referred to as "index time" operations, which are distinct from "search time" operations that are discussed further below.

The indexer 532, which may be referred to herein as a data indexing component, coordinates and performs most of the index time operations. The indexer 532 can be implemented using program code that can be executed on a computing device. The program code for the indexer 532 can be stored on a non-transitory computer-readable medium (e.g. a magnetic, optical, or solid state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 532. In some implementations, the indexer 532 executes on the computing device 504 through which a user can access the indexing system 520. In some implementations, the indexer 532 executes on a different computing device than the illustrated computing device 504.

The indexer 532 may be executing on the computing device that also provides the data source 502 or may be executing on a different computing device. In implementations wherein the indexer 532 is on the same computing device as the data source 502, the data produced by the data source 502 may be referred to as "local data." In other implementations the data source 502 is a component of a first computing device and the indexer 532 executes on a second computing device that is different from the first computing device. In these implementations, the data produced by the data source 502 may be referred to as "remote data." In some implementations, the first computing device is "on-prem" and in some implementations the first computing device is "in the cloud." In some implementations, the indexer 532 executes on a computing device in the cloud and the operations of the indexer 532 are provided as a service to entities that subscribe to the services provided by the data intake and query system.

For a given data produced by the data source 502, the indexing system 520 can be configured to use one of several methods to ingest the data into the indexer 532. These methods include upload 522, monitor 524, using a forwarder 526, or using HyperText Transfer Protocol (HTTP 528) and an event collector 530. These and other methods for data ingestion may be referred to as "getting data in" (GDI) methods.

Using the upload 522 method, a user can specify a file for uploading into the indexer 532. For example, the monitoring console 516 can include commands or an interface through which the user can specify where the file is located (e.g., on which computing device and/or in which directory of a file system) and the name of the file. The file may be located at the data source 502 or maybe on the computing device where the indexer 532 is executing. Once uploading is initiated, the indexer 532 processes the file, as discussed further below. Uploading is a manual process and occurs when instigated by a user. For automated data ingestion, the other ingestion methods are used.

The monitor 524 method enables the indexer 532 to monitor the data source 502 and continuously or periodically obtain data produced by the data source 502 for ingestion by the indexer 532. For example, using the monitoring console 516, a user can specify a file or directory for monitoring. In this example, the indexer 532 can execute a monitoring process that detects whenever the file or directory is modified and causes the file or directory contents to be sent to the indexer 532. As another example, a user can specify a network port for monitoring. In this example, a monitoring process can capture data received at or transmitting from the network port and cause the data to be sent to the indexer 532. In various examples, monitoring can also be configured for data sources such as operating system event logs, performance data generated by an operating system, operating system registries, operating system directory services, and other data sources.

Monitoring is available when the data source 502 is local to the indexer 532 (e.g., the data source 502 is on the computing device where the indexer 532 is executing). Other data ingestion methods, including forwarding and the event collector 530, can be used for either local or remote data sources.

A forwarder 526, which may be referred to herein as a data forwarding component, is a software process that sends data from the data source 502 to the indexer 532. The forwarder 526 can be implemented using program code that can be executed on the computer device that provides the data source 502. A user launches the program code for the forwarder 526 on the computing device that provides the data source 502. The user can further configure the forwarder 526, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 526 can provide various capabilities. For example, the forwarder 526 can send the data unprocessed or can perform minimal processing on the data before sending the data to the indexer 532. Minimal processing can include, for example, adding metadata tags to the data to identify a source, source type, and/or host, among other information, dividing the data into blocks, and/or applying a timestamp to the data. In some implementations, the forwarder 526 can break the data into individual events (event generation is discussed further below) and send the events to a receiver. Other operations that the forwarder 526 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 530 provides an alternate method for obtaining data from the data source 502. The event collector 530 enables data and application events to be sent to the indexer 532 using HTTP 528. The event collector 530 can be implemented using program code that can be executing on a computing device. The program code may be a component of the data intake and query system or can be a standalone component that can be executed independently of the data intake and query system and operates in cooperation with the data intake and query system.

To use the event collector 530, a user can, for example using the monitoring console 516 or a similar interface provided by the user interface system 514, enable the event collector 530 and configure an authentication token. In this context, an authentication token is a piece of digital data generated by a computing device, such as a server, that contains information to identify a particular entity, such as a user or a computing device, to the server. The token will contain identification information for the entity (e.g., an alphanumeric string that is unique to each token) and a code that authenticates the entity with the server. The token can be used, for example, by the data source 502 as an alternative method to using a username and password for authentication.

To send data to the event collector 530, the data source 502 is supplied with a token and can then send HTTP 528 requests to the event collector 530. To send HTTP 528 requests, the data source 502 can be configured to use an HTTP client and/or to use logging libraries such as those supplied by Java, JavaScript, and .NET libraries. An HTTP client enables the data source 502 to send data to the event collector 530 by supplying the data, and a Uniform Resource Identifier (URI) for the event collector 530 to the HTTP client. The HTTP client then handles establishing a connection with the event collector 530, transmitting a request containing the data, closing the connection, and receiving an acknowledgment if the event collector 530 sends one. Logging libraries enable HTTP 528 requests to the event collector 530 to be generated directly by the data source. For example, an application can include or link a logging library, and through functionality provided by the logging library manage establishing a connection with the event collector 530, transmitting a request, and receiving an acknowledgement.

An HTTP 528 request to the event collector 530 can contain a token, a channel identifier, event metadata, and/or event data. The token authenticates the request with the event collector 530. The channel identifier, if available in the indexing system 520, enables the event collector 530 to segregate and keep separate data from different data sources. The event metadata can include one or more key-value pairs that describe the data source 502 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include both event data and event metadata. Additionally, one request can include event data for one or more events.

In some implementations, the event collector 530 extracts events from HTTP 528 requests and sends the events to the indexer 532. The event collector 530 can further be configured to send events to one or more indexers. Extracting the events can include associating any metadata in a request with the event or events included in the request. In these implementations, event generation by the indexer 532 (discussed further below) is bypassed, and the indexer 532 moves the events directly to indexing. In some implementations, the event collector 530 extracts event data from a request and outputs the event data to the indexer 532, and the indexer generates events from the event data. In some implementations, the event collector 530 sends an acknowledgement message to the data source 502 to indicate that the event collector 530 has received a particular request form the data source 502, and/or to indicate to the data source 502 that events in the request have been added to an index.

The indexer 532 ingests incoming data and transforms the data into searchable knowledge in the form of events. In the data intake and query system, an event is a single piece of data that represents activity of the component represented in FIG. 5 by the data source 502. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value, and in some cases the event includes only the value and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes storing of each event in the data structure of an index. As an example, the indexer 532 can include a parsing module 534 and an indexing module 536 for generating and storing the events. The parsing module 534 and indexing module 536 can be modular and pipelined, such that one component can be operating on a first set of data while the second component is simultaneously operating on a second sent of data. Additionally, the indexer 532 may at any time have multiple instances of the parsing module 534 and indexing module 536, with each set of instances configured to simultaneously operate on data from the same data source or from different data sources. The parsing module 534 and indexing module 536 are illustrated in FIG. 5 to facilitate discussion, with the understanding that implementations with other components are possible to achieve the same functionality.

The parsing module 534 determines information about incoming event data, where the information can be used to identify events within the event data. For example, the parsing module 534 can associate a source type with the event data. A source type identifies the data source 502 and describes a possible data structure of event data produced by the data source 502. For example, the source type can indicate which fields to expect in events generated at the data source 502 and the keys for the values in the fields, and possibly other information such as sizes of fields, an order of the fields, a field separator, and so on. The source type of the data source 502 can be specified when the data source 502 is configured as a source of event data. Alternatively, the parsing module 534 can determine the source type from the event data, for example from an event field in the event data or using machine learning techniques applied to the event data.

Other information that the parsing module 534 can determine includes timestamps. In some cases, an event includes a timestamp as a field, and the timestamp indicates a point in time when the action represented by the event occurred or was recorded by the data source 502 as event data. In these cases, the parsing module 534 may be able to determine from the source type associated with the event data that the timestamps can be extracted from the events themselves. In some cases, an event does not include a timestamp and the parsing module 534 determines a timestamp for the event, for example from a name associated with the event data from the data source 502 (e.g., a file name when the event data is in the form of a file) or a time associated with the event data (e.g., a file modification time). As another example, when the parsing module 534 is not able to determine a timestamp from the event data, the parsing module 534 may use the time at which it is indexing the event data. As another example, the parsing module 534 can use a user-configured rule to determine the timestamps to associate with events.

The parsing module 534 can further determine event boundaries. In some cases, a single line (e.g., a sequence of characters ending with a line termination) in event data represents one event while in other cases, a single line represents multiple events. In yet other cases, one event may span multiple lines within the event data. The parsing module 534 may be able to determine event boundaries from the source type associated with the event data, for example from a data structure indicated by the source type. In some implementations, a user can configure rules the parsing module 534 can use to identify event boundaries.

The parsing module 534 can further extract data from events and possibly also perform transformations on the events. For example, the parsing module 534 can extract a set of fields (key-value pairs) for each event, such as a host or hostname, source or source name, and/or source type. The parsing module 534 may extract certain fields by default or based on a user configuration. Alternatively or additionally, the parsing module 534 may add fields to events, such as a source type or a user-configured field. As another example of a transformation, the parsing module 534 can anonymize fields in events to mask sensitive information, such as social security numbers or account numbers. Anonymizing fields can include changing or replacing values of specific fields. The parsing module 534 can further perform user-configured transformations.

The parsing module 534 outputs the results of processing incoming event data to the indexing module 536, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 532 can be configured to identify searchable segments that are parts of fields, searchable segments that are entire fields, or both. The parsing module 534 organizes the searchable segments into a lexicon or dictionary for the event data, with the lexicon including each searchable segment (e.g., the field "src=10.10.1.1") and a reference to the location of each occurrence of the searchable segment within the event data (e.g., the location within the event data of each occurrence of "src=10.10.1.1"). As discussed further below, the search system can use the lexicon, which is stored in an index file 546, to find event data that matches a search query. In some implementations, segmentation can alternatively be performed by the forwarder 526. Segmentation can also be disabled, in which case the indexer 532 will not build a lexicon for the event data. When segmentation is disabled, the search system searches the event data directly.

Building index data structures generates the index 538. The index 538 is a storage data structure on a storage device (e.g., a disk drive or other physical device for storing digital data). The storage device may be a component of the computing device on which the indexer 532 is operating (referred to herein as local storage) or may be a component of a different computing device (referred to herein as remote storage) that the indexer 532 has access to over a network. The indexer 532 can manage more than one index and can manage indexes of different types. For example, the indexer 532 can manage event indexes, which impose minimal structure on stored data and can accommodate any type of data. As another example, the indexer 532 can manage metrics indexes, which use a highly structured format to handle the higher volume and lower latency demands associated with metrics data.

The indexing module 536 organizes files in the index 538 in directories referred to as buckets. The files in a bucket 544 can include raw data files, index files, and possibly also other metadata files. As used herein, "raw data" means data as when the data was produced by the data source 502, without alteration to the format or content. As noted previously, the parsing module 534 may add fields to event data and/or perform transformations on fields in the event data. Event data that has been altered in this way is referred to herein as enriched data. A raw data file 548 can include enriched data, in addition to or instead of raw data. The raw data file 548 may be compressed to reduce disk usage. An index file 546, which may also be referred to herein as a "time-series index" or tsidx file, contains metadata that the indexer 532 can use to search a corresponding raw data file 548. As noted above, the metadata in the index file 546 includes a lexicon of the event data, which associates each unique keyword in the event data with a reference to the location of event data within the raw data file 548. The keyword data in the index file 546 may also be referred to as an inverted index. In various implementations, the data intake and query system can use index files for other purposes, such as to store data summarizations that can be used to accelerate searches.

A bucket 544 includes event data for a particular range of time. The indexing module 536 arranges buckets in the index 538 according to the age of the buckets, such that buckets for more recent ranges of time are stored in short-term storage 540 and buckets for less recent ranges of time are stored in long-term storage 542. Short-term storage 540 may be faster to access while long-term storage 542 may be slower to access. Buckets may be moves from short-term storage 540 to long-term storage 542 according to a configurable data retention policy, which can indicate at what point in time a bucket is old enough to be moved.

A bucket's location in short-term storage 540 or long-term storage 542 can also be indicated by the bucket's status. As an example, a bucket's status can be "hot," "warm," "cold," "frozen," or "thawed." In this example, hot bucket is one to which the indexer 532 is writing data and the bucket becomes a warm bucket when the indexer 532 stops writing data to it. In this example, both hot and warm buckets reside in short-term storage 540. Continuing this example, when a warm bucket is moved to long-term storage 542, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 520 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can be configured (e.g., three copies of each buckets must exist within the cluster), and indexers to which buckets are copied may be selected to optimize distribution of data across the cluster.

A user can view the performance of the indexing system 520 through the monitoring console 516 provided by the user interface system 514. Using the monitoring console 516, the user can configure and monitor an index cluster, and see information such as disk usage by an index, volume usage by an indexer, index and volume size over time, data age, statistics for bucket types, and bucket settings, among other information.

Figure 6:
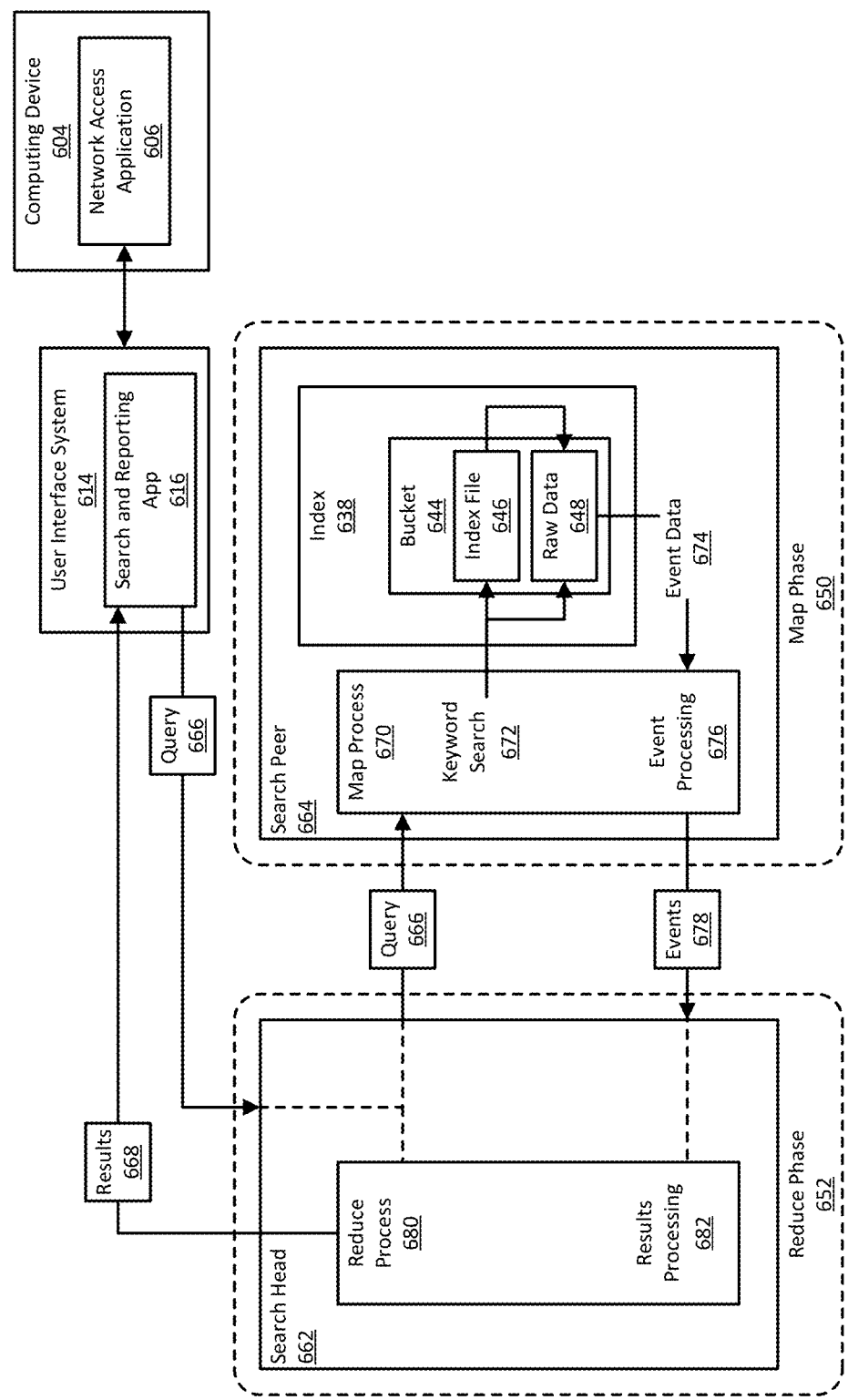
FIG. 6 is a block diagram illustrating an example of a search system 660 of a data intake and query system.

FIG. 6 is a block diagram illustrating in greater detail an example of the search system 660 of a data intake and query system, such as the data intake and query system 410 of FIG. 4. The search system 660 of FIG. 6 issues a query 666 to a search head 662, which sends the query 666 to a search peer 664. Using a map process 670, the search peer 664 searches the appropriate index 638 for events identified by the query 666 and sends events 678 so identified back to the search head 662. Using a reduce process 680, the search head 662 processes the events 678 and produces results 668 to respond to the query 666. The results 668 can provide useful insights about the data stored in the index 638. These insights can aid in the administration of information technology systems, in security analysis of information technology systems, and/or in analysis of the development environment provided by information technology systems.

The query 666 that initiates a search is produced by a search and reporting app 616 that is available through the user interface system 614 of the data intake and query system. Using a network access application 606 executing on a computing device 604, a user can input the query 666 into a search field provided by the search and reporting app 616. Alternatively or additionally, the search and reporting app 616 can include pre-configured queries or stored queries that can be activated by the user. In some cases, the search and reporting app 616 initiates the query 666 when the user enters the query 666. In these cases, the query 666 maybe referred to as an "ad-hoc" query. In some cases, the search and reporting app 616 initiates the query 666 based on a schedule. For example, the search and reporting app 616 can be configured to execute the query 666 once per hour, once per day, at a specific time, on a specific date, or at some other time that can be specified by a date, time, and/or frequency. These types of queries maybe referred to as scheduled queries.

The query 666 is specified using a search processing language. The search processing language includes commands or search terms that the search peer 664 will use to identify events to return in the search results 668. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 666 to include sequential commands, where a subsequent command may operate on the results of a prior command. As an example, sequential commands may be separated in the query 666 by a vertical line ("|" or "pipe") symbol.

In addition to one or more search commands, the query 666 includes a time indicator. The time indicator limits searching to events that have timestamps described by the indicator. For example, the time indicator can indicate a specific point in time (e.g., 10:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 666 occurs in two broad phases: a map phase 650 and a reduce phase 652. The map phase 650 takes place across one or more search peers. In the map phase 650, the search peers locate event data that matches the search terms in the search query 666 and sorts the event data into field-value pairs. When the map phase 650 is complete, the search peers send events that they have found to one or more search heads for the reduce phase 652. During the reduce phase 652, the search heads process the events through commands in the search query 666 and aggregate the events to produce the final search results 668.

A search head, such as the search head 662 illustrated in FIG. 6, is a component of the search system 660 that manages searches. The search head 662, which may also be referred to herein as a search management component, can be implemented using program code that can be executed on a computing device. The program code for the search head 662 can be stored on a non-transitory computer-readable medium and from this medium can be loaded or copied to the memory of a computing device. One or more hardware processors of the computing device can read the program code from the memory and execute the program code in order to implement the operations of the search head 662.

Upon receiving the search query 666, the search head 662 directs the query 666 to one or more search peers, such as the search peer 664 illustrated in FIG. 6. "Search peer" is an alternate name for "indexer" and a search peer may be largely similar to the indexer described previously. The search peer 664 may be referred to as a "peer node" when the search peer 664 is part of an indexer cluster. The search peer 664, which may also be referred to as a search execution component, can be implemented using program code that can be executed on a computing device. In some implementations, one set of program code implements both the search head 662 and the search peer 664 such that the search head 662 and the search peer 664 form one component. In some implementations, the search head 662 is an independent piece of code that performs searching and no indexing functionality. In these implementations, the search head 662 may be referred to as a dedicated search head.

The search head 662 may consider multiple criteria when determining whether to send the query 666 to the particular search peer 664. For example, the search system 660 may be configured to include multiple search peers that each have duplicative copies of at least some of the event data and are implanted using different hardware resources q. In this example, the sending the search query 666 to more than one search peer allows the search system 660 to distribute the search workload across different hardware resources. As another example, search system 660 may include different search peers for different purposes (e.g., one has an index storing a first type of data or from a first data source while a second has an index storing a second type of data or from a second data source). In this example, the search query 666 may specify which indexes to search, and the search head 662 will send the query 666 to the search peers that have those indexes.

To identify events 678 to send back to the search head 662, the search peer 664 performs a map process 670 to obtain event data 674 from the index 638 that is maintained by the search peer 664. During a first phase of the map process 670, the search peer 664 identifies buckets that have events that are described by the time indicator in the search query 666. As noted above, a bucket contains events whose timestamps fall within a particular range of time. For each bucket 644 whose events can be described by the time indicator, during a second phase of the map process 670, the search peer 664 performs a keyword search 672 using search terms specified in the search query 666. The search terms can be one or more of keywords, phrases, fields, Boolean expressions, and/or comparison expressions that in combination describe events being searched for. When segmentation is enabled at index time, the search peer 664 performs the keyword search 672 on the bucket's index file 646. As noted previously, the index file 646 includes a lexicon of the searchable terms in the events stored in the bucket's raw data 648 file. The keyword search 672 searches the lexicon for searchable terms that correspond to one or more of the search terms in the query 666. As also noted above, the lexicon incudes, for each searchable term, a reference to each location in the raw data 648 file where the searchable term can be found. Thus, when the keyword search identifies a searchable term in the index file 646 that matches a search term in the query 666, the search peer 664 can use the location references to extract from the raw data 648 file the event data 674 for each event that include the searchable term.

In cases where segmentation was disabled at index time, the search peer 664 performs the keyword search 672 directly on the raw data 648 file. To search the raw data 648, the search peer 664 may identify searchable segments in events in a similar manner as when the data was indexed. Thus, depending on how the search peer 664 is configured, the search peer 664 may look at event fields and/or parts of event fields to determine whether an event matches the query 666. Any matching events can be added to the event data 674 read from the raw data 648 file. The search peer 664 can further be configured to enable segmentation at search time, so that searching of the index 638 causes the search peer 664 to build a lexicon in the index file 646.

The event data 674 obtained from the raw data 648 file includes the full text of each event found by the keyword search 672. During a third phase of the map process 670, the search peer 664 performs event processing 676 on the event data 674, with the steps performed being determined by the configuration of the search peer 664 and/or commands in the search query 666. For example, the search peer 664 can be configured to perform field discovery and field extraction. Field discovery is a process by which the search peer 664 identifies and extracts key-value pairs from the events in the event data 674. The search peer 664 can, for example, be configured to automatically extract the first 100 fields (or another number of fields) in the event data 674 that can be identified as key-value pairs. As another example, the search peer 664 can extract any fields explicitly mentioned in the search query 666. The search peer 664 can, alternatively or additionally, be configured with particular field extractions to perform.

Other examples of steps that can be performed during event processing 676 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The search peer 664 sends processed events 678 to the search head 662, which performs a reduce process 680. The reduce process 680 potentially receives events from multiple search peers and performs various results processing 682 steps on the received events. The results processing 682 steps can include, for example, aggregating the events received from different search peers into a single set of events, deduplicating and aggregating fields discovered by different search peers, counting the number of events found, and sorting the events by timestamp (e.g., newest first or oldest first), among other examples. Results processing 682 can further include applying commands from the search query 666 to the events. The query 666 can include, for example, commands for evaluating and/or manipulating fields (e.g., to generate new fields from existing fields or parse fields that have more than one value). As another example, the query 666 can include commands for calculating statistics over the events, such as counts of the occurrences of fields, or sums, averages, ranges, and so on, of field values. As another example, the query 666 can include commands for generating statistical values for purposes of generating charts of graphs of the events.

The reduce process 680 outputs the events found by the search query 666, as well as information about the events.

The search head 662 transmits the events and the information about the events as search results 668, which are received by the search and reporting app 616. The search and reporting app 616 can generate visual interfaces for viewing the search results 668. The search and reporting app 616 can, for example, output visual interfaces for the network access application 606 running on a computing device 604 to generate.

The visual interfaces can include various visualizations of the search results 668, such as tables, line or area charts, Chloropleth maps, or single values. The search and reporting app 616 can organize the visualizations into a dashboard, where the dashboard includes a panel for each visualization. A dashboard can thus include, for example, a panel listing the raw event data for the events in the search results 668, a panel listing fields extracted at index time and/or found through field discovery along with statistics for those fields, and/or a timeline chart indicating how many events occurred at specific points in time (as indicated by the timestamps associated with each event). In various implementations, the search and reporting app 616 can provide one or more default dashboards. Alternatively or additionally, the search and reporting app 616 can include functionality that enables a user to configure custom dashboards.

The search and reporting app 616 can also enable further investigation into the events in the search results 668. The process of further investigation may be referred to as drill-down. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 666. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

What is claimed is:

1. A computer-implemented method comprising:
   causing, by a computer system, display of a graphical user interface (GUI) that includes a data visualization corresponding to a time stamped data set having time stamps within a time interval;
   mapping a first type of input signal to a second type of input signal that is different from the first type of input signal, wherein the first type of input signal is a type of signal generated by an input device communicatively coupled to the computer system, wherein the second type of input signal is a type of signal generated by the computer system or by another input device and is configured to operate a graphical user control of the GUI, and wherein prior to the mapping, the first type of input signal is not configured to operate the graphical user control of the GUI, and wherein mapping the first type of input signal to the second type of input signal includes:
      mapping, by a driver of the input device, the first type of input signal to an intermediate type of input signal, and
      mapping the intermediate type of input signal to the second type of input signal;
   receiving, from the input device, an input signal of the first type;
   in response to receiving the input signal of the first type, causing an input signal of the second type to be applied to the graphical user control based on the mapping;
   in response to the input signal of the second type being applied, adjusting the time interval; and
   updating, by the computer system, the data visualization automatically in response to the second input, wherein the data visualization is updated to correspond to an updated data set having timestamps within the adjusted time interval.

2. The method of claim 1, wherein the graphical user control includes a slider, wherein the input signal of the second type causes a position of the slider to be moved, and wherein the data visualization is updated as the position of the slider changes.

3. The method of claim 1, wherein the input signal of the second type causes the time interval to be adjusted by incrementing the time interval, and wherein the data visualization is updated according to the incremented time interval to produce an updated data visualization.

4. The method of claim 1, wherein the graphical user control includes a playback element, and wherein updating the data visualization includes:
   causing, in response to receiving an input to the playback element, a time-lapse display of the data visualization by iterative updating.

5. The method of claim 1, wherein the input device is a wireless remote, and wherein mapping the first type of input signal to the second type of input signal enables the wireless remote to control the GUI in a manner that is otherwise controlled by a mouse or trackpad.

6. The method of claim 1, further comprising:
   prior to causing display of the GUI, executing a search for the data visualization to produce a set of search results, wherein the data visualization the updated data visualization are visualizations of the set of search results.

7. A computing device, comprising:
   a memory;
   a network interface; and
   at least one processor coupled to the memory and the network interface, and configured to perform operations including:
   causing display of a graphical user interface (GUI) that includes a data visualization corresponding to a time stamped data set having time stamps within a time interval;
   mapping a first type of input signal to a second type of input signal that is different from the first type of input signal, wherein the first type of input signal a type of signal generated by an input device communicatively coupled to the computing device, wherein the second type of input signal is a type of signal generated by the computing device or by another input device and is configured to operate a graphical user control of the GUI, and wherein prior to the mapping, the first type of input signal is not configured to operate the graphical user control of the GUI, and wherein mapping the first type of input signal to the second type of input signal includes:
  mapping, by a driver of the input device, the first type of input signal to an intermediate type of input signal, and
  mapping the intermediate type of input signal to the second type of input signal;
receiving, from the input device, an input signal of the first type;
in response to receiving the input signal of the first type, causing an input signal of the second type to be applied to the graphical user control based on the mapping;
in response to the input signal of the second type being applied, adjusting the time interval; and
updating the data visualization automatically in response to the second input, wherein the data visualization is updated to correspond to an updated data set having timestamps within the adjusted time interval.

8. The computing device of claim 7, wherein the graphical user control includes a slider, wherein the input signal of the second type causes a position of the slider to be moved, and wherein the data visualization is updated as the position of the slider changes.

9. The computing device of claim 7, wherein the input signal of the second type causes the time interval to be adjusted by incrementing the time interval, and wherein the data visualization is updated according to the incremented time interval to produce an updated data visualization.

10. The computing device of claim 7, wherein the graphical user control includes a playback element, and wherein updating the data visualization includes:
  causing, in response to receiving an input to the playback element, a time-lapse display of the data visualization by iterative updating.

11. The computing device of claim 7, wherein the input device is a wireless remote, and wherein mapping the first type of input signal to the second type of input signal enables the wireless remote to control the GUI in a manner that is otherwise controlled by a mouse or trackpad.

12. The computing device of claim 7, wherein the operations further include:
  prior to causing display of the GUI, executing a search for the data visualization to generate a set of search results, wherein the data visualization and the updated data visualization are visualizations of the set of search results.

13. A non-transitory computer-readable medium having stored thereon instructions, execution of which by one or more processors in a computing system causes the computing system to perform operations including:
  causing display of a graphical user interface (GUI) that includes a data visualization corresponding to a time stamped data set having time stamps within a time interval;
  mapping a first type of input signal to a second type of input signal that is different from the first type of input signal, wherein the first type of input signal is a type of signal generated by an input device communicatively coupled to the computing system, wherein the second type of input signal is a type of signal generated by the computer system or by another input device and is configured to operate a graphical user control of the GUI, and wherein prior to the mapping, the first type of input signal is not configured to operate the graphical user control of the GUI, and wherein mapping the first type of input signal to the second type of input signal includes:
    mapping, by a driver of the input device, the first type of input signal to an intermediate type of input signal, and
    mapping the intermediate type of input signal to the second type of input signal;
  receiving, from the input device, an input signal of the first type;
  in response to receiving the input signal of the first type, causing an input signal of the second type to be applied to the graphical user control based on the mapping;
  in response to the input signal of the second type being applied, adjusting the time interval; and
  updating the data visualization automatically in response to the second input, wherein the data visualization is updated to correspond to an updated data set having timestamps within the adjusted time interval.

14. The non-transitory computer-readable medium of claim 13, wherein the graphical user control includes a slider, wherein the input signal of the second type causes a position of the slider to be moved, and wherein the data visualization is updated as the position of the slider changes.

15. The non-transitory computer-readable medium of claim 13, wherein the input signal of the second type causes the time interval to be adjusted by incrementing the time interval, and wherein the data visualization is updated according to the incremented time interval to produce an updated data visualization.

16. The non-transitory computer-readable medium of claim 13, wherein the graphical user control includes a playback element, and wherein updating the data visualization includes:
  causing, in response to receiving an input to the playback element, a time-lapse display of the data visualization by iterative updating.

17. The non-transitory computer-readable medium of claim 13, wherein the operations further include:
  prior to causing display of the GUI, executing a search for the data visualization to generate a set of search results, wherein the data visualization and the updated data visualization are visualizations of the respective sets of search results.

* * * * *